United States Patent
Hermans et al.

(10) Patent No.: US 10,215,560 B2
(45) Date of Patent: Feb. 26, 2019

(54) METHOD FOR SHAPE CLASSIFICATION OF AN OBJECT

(71) Applicant: KLA-Tencor Corporation, Milpitas, CA (US)

(72) Inventors: Laurent Hermans, Borsbeek (BE); Eric Delfosse, Hasselt (BE); Frans Nijs, Leopoldsburg (BE); Francis Thissen, Kessel-Lo (BE); Johan De Greeve, Heverlee (BE)

(73) Assignee: KLA Tencor Corporation, Milpitas, CA (US)

( * ) Notice: Subject to any disclaimer, the term of this patent is extended or adjusted under 35 U.S.C. 154(b) by 510 days.

(21) Appl. No.: 14/984,670

(22) Filed: Dec. 30, 2015

(65) Prior Publication Data

US 2016/0282111 A1    Sep. 29, 2016

Related U.S. Application Data

(63) Continuation of application No. PCT/US2015/045961, filed on Aug. 19, 2015.

(60) Provisional application No. 62/137,650, filed on Mar. 24, 2015.

(51) Int. Cl.
| | |
|---|---|
| *G01B 21/20* | (2006.01) |
| *G01B 21/30* | (2006.01) |
| *G06K 9/00* | (2006.01) |
| *G06K 9/62* | (2006.01) |
| *G06K 9/48* | (2006.01) |

(52) U.S. Cl.
CPC ............ *G01B 21/20* (2013.01); *G01B 21/30* (2013.01); *G06K 9/00214* (2013.01); *G06K 9/6211* (2013.01); *G06K 2009/487* (2013.01)

(58) Field of Classification Search
CPC ............. G01B 21/20; G01B 5/20; G01B 7/28
USPC ........ 33/1 BB, 551; 702/35, 167, 168; 703/2
See application file for complete search history.

(56) References Cited

U.S. PATENT DOCUMENTS

| | | | | |
|---|---|---|---|---|
| 3,400,463 A | * | 9/1968 | Barringer ............... | G01B 7/282 |
| | | | | 33/546 |
| 5,446,673 A | * | 8/1995 | Bauer ..................... | G01B 17/02 |
| | | | | 700/195 |
| 6,665,080 B1 | * | 12/2003 | Haertig ................ | G05B 19/401 |
| | | | | 356/601 |

(Continued)

FOREIGN PATENT DOCUMENTS

| | | |
|---|---|---|
| EP | 2765554 A1 | 8/2014 |
| WO | WO2003/032129 | 4/2003 |

*Primary Examiner* — Christopher W Fulton
(74) *Attorney, Agent, or Firm* — Simpson & Simpson, PLLC

(57) ABSTRACT

A method for shape classification of an object is provided. Shape categories are provided which specify a plane and points therein relative to the object, and also specify at least one limit coordinate for each such point, the limit coordinate defining a boundary in a direction normal to the plane for the shape of the object considered in order for the object to be classified into a respective shape category. The shape categories can be provided by a user, making the method very flexible. The shape categories can in particular be derived from a set of samples of objects representing a shape category to be defined. For classification, the position of a surface of the object is measured at each of the points defined in the shape category, and the result is compared with the corresponding limit coordinate.

15 Claims, 5 Drawing Sheets

(56) References Cited

U.S. PATENT DOCUMENTS

| | | | |
|---|---|---|---|
| 9,726,481 B2* | 8/2017 | McMurtry | G01B 7/008 |
| 2003/0056147 A1* | 3/2003 | Yutkowitz | G05B 11/28 |
| | | | 714/25 |
| 2005/0039342 A1* | 2/2005 | Kirstine | G01B 5/068 |
| | | | 33/552 |
| 2006/0165275 A1* | 7/2006 | Horita | G01B 11/2522 |
| | | | 382/152 |
| 2007/0127754 A1 | 6/2007 | Slabaugh et al. | |
| 2009/0033947 A1* | 2/2009 | Boyer | G01B 11/2504 |
| | | | 356/611 |
| 2009/0110301 A1 | 4/2009 | Schopp et al. | |
| 2009/0248356 A1 | 10/2009 | Kriegmair | |
| 2010/0316280 A1 | 12/2010 | Lancaster et al. | |
| 2011/0035196 A1* | 2/2011 | Morton | G06F 17/11 |
| | | | 703/2 |
| 2011/0301915 A1* | 12/2011 | Lobato | G01B 21/04 |
| | | | 702/167 |
| 2012/0033873 A1 | 2/2012 | Ozeki et al. | |
| 2015/0121710 A1* | 5/2015 | McMurtry | G01B 21/045 |
| | | | 33/503 |
| 2015/0143708 A1* | 5/2015 | Noda | G01B 5/20 |
| | | | 33/503 |

* cited by examiner

METHOD FOR SHAPE CLASSIFICATION OF AN OBJECT

CROSS-REFERENCE TO RELATED APPLICATIONS

This application is filed under 35 U.S.C. § 111(a) and § 365(c) as a continuation of international Patent Application No. PCT/US2015/045961, filed on Aug. 19, 2015, which application claims the benefit of U.S. Provisional Patent Application No. 62/137,650, filed on Mar. 24, 2015, which applications are incorporated herein by reference in their entireties,

FIELD OF THE INVENTION

The method relates to the classification of the shape of an object. An object is classified into one or plural user-defined categories depending on whether the object's shape fits between boundaries associated with each category, The object may for example be a component for an electronic device.

BACKGROUND OF THE INVENTION

In various fields of technology objects are handled which, though of the same type, may vary in their shape. In such a case, it is often necessary to obtain more precise information on this shape for each individual object, as the mere knowledge of the type of object is not sufficient. Such objects may for example be components of an apparatus or device, for instance an electronic device. Due to, usually unavoidable, inaccuracies in manufacturing the components, each component will exhibit deviations from an ideal or nominal shape. A further cause of such deviations is deformations of a specific component which result from mounting the component on further components, for example due to mechanical stresses. The deviations may lead to problems in assembling the respective apparatus or device, which may lead to partial or complete malfunction of the final product.

For example, when manufacturing and/or assembling electronic components (IC packages, substrates, etc.) the actual topography or warpage (deformation) shapes of these components are important in order to ensure proper mechanical and electrical contact with the supporting devices on which these components are mounted. One use-case for which this feature has become even more important is for stacked assemblies where (increasingly smaller) electronic components are stacked on one another. In order to ensure the stacked components used for such assembly are still in proper electrical contact, a classification of the warpage shape of the individual components prior to assembly is required. In this way, components can be sorted into categories which are known to stack well prior to assembly. Another use-case encompasses the categorization of the warpage shape of top and bottom components of stacked devices after assembly to determine matching top and bottom categories.

A known method of categorization is to perform a global second order fit to a surface of interest of the object, and to categorize the object based on the coefficients of this fit. The categories of objects possible by this approach are rather limited, and furthermore are fixed by the geometry of second order surfaces.

SUMMARY OF THE INVENTION

The present invention comprises a method for shape classification of an object, the method comprising the steps of providing a first number, N, of shape categories, each shape category specifying a second number, $M\_k$, of points in a plane relative to the object, and, specifying for each point at least one limit coordinate along a direction normal to the plane, measuring at each of the points a position of at least one surface of the object along the direction normal to the plane, and, checking, for each shape category, whether all measured positions of the at least one surface are compatible with the corresponding at least one limit coordinate, and if this is the case classifying the object to be of the respective shape category.

The present invention also comprises a method for shape classification of an object, the method comprising the steps of a) providing a number N of different shape categories $C\_k$, $1 \leq k \leq N$, each shape category $C\_k$ specifying a nominal shape comprising a nominal surface, a number $M\_k$ of points in a plane relative to the nominal shape, the nominal surface giving a coordinate $Z\_i$, $1 \leq i \leq M\_k$, along a direction normal to the plane at each of the $M\_k$ points, and the shape category also specifying for each such point two deviations $\Delta Zu\_i$ and $\Delta Zd\_i$ from the coordinate $Z\_i$, b) aligning the object and the nominal shape with each other, c) measuring at each of the number $M\_k$ of points a position of a surface of the object along the direction normal to the plane, resulting in a measured value $Zm\_i$ for each respective point, d) checking for each shape category $C\_k$ whether $Z\_i - \Delta Zd\_i < Zm\_i < Z\_i + \Delta Zu\_i$ holds for each of the $M\_k$ points, and if so, classifying the object to be of the respective shape category, e) repeating steps b to d for each shape category, and, f) repeating steps a) to e) for each surface relevant for the classification of the object.

The present invention also comprises a method for shape classification of an object, the method comprising the steps of a) providing a number N of different shape categories $C\_k$, $1 \leq k \leq N$, each shape category specifying a nominal shape comprising a first nominal surface and a second nominal surface, a number $M\_k$ of points in a plane relative to the nominal shape, the first nominal surface giving a coordinate $Z1\_i$, $1 \leq i \leq M\_k$, along a direction normal to the plane at each of the $M\_k$ points, the second nominal surface giving a coordinate $Z2\_i$, $1 \leq i \leq M\_k$, along the direction normal to the plane at each of the $M\_k$ points, and the shape category also specifying for each such point a deviation $\Delta Z1\_i$ from the coordinate $Z1\_i$ and a deviation $\Delta Z2\_i$ from the coordinate $Z2\_i$, b) aligning the object and the nominal shape with each other, c) measuring at each of the respective number $M\_k$ of points a position of a first surface of the object along the direction normal to the plane, resulting in a measured value $Z1m\_i$ for each respective point, d) measuring at each of the respective number $M\_k$ of points a position of a second surface of the object along the direction normal to the plane, resulting in a measured value $Z2m\_i$ for each respective point, e) checking for each shape category whether $Z1\_i - \Delta Z1\_i < Z1m\_i$ and $Z2m\_i < Z2\_i + \Delta Z2\_i$ hold for each of the $M\_k$ points, and if so, classifying the object to be of the respective shape category, and, repeating steps b) to e) for each shape category.

A general object of the present invention is to provide a method for shape classification of an object, which allows flexibly classifying objects according to user-defined categories, which may be updated or modified as required.

The above examples of use-cases are provided for illustration; the invention is not limited to these or similar applications, but encompasses any application where the shape of a component or object, in general, needs to be classified.

In an embodiment, a method according to the present invention for shape classification of an object, a number of shape categories are provided. This, in particular, can be done by a user; the user can choose already existing shape categories or define new shape categories depending on the classification requirements. For example, if components are to be used in a device which have not been used before, new shape categories will usually have to be defined for these new components. If known components are to be assembled into a device in a known fashion, previously defined shape categories may be used. Assembling known components in a novel fashion may require the definition of new shape categories.

Each shape category specifies, relative to the object, a number of points in a plane; i.e. the plane is defined relative to the object and the points in this plane are also defined relative to the object, for instance relative to a coordinate system fixed relative to the object. The number of points specified in this way by a shape category need not be the same for each shape category. Also, the location of the points in the plane can differ between shape categories.

In any case, each shape category specifies, for each point it defines as explained above, at least one limit coordinate along a direction normal to the plane; each limit coordinate corresponds to a value of a coordinate in the direction normal to the plane, and is for example specified by giving this value, or by giving a deviation from a reference value, as will be discussed further below. The value given is termed limit coordinate because it is used in defining the categories as will be seen.

An object is classified according to the invention based on its shape. As the shape of an object is determined by the entire surface of the object, the classification is based on the shape of at least one surface, or portion of the entire surface, of the object. Each shape category is associated with at least one surface of the object according to its definition, as it must be clear to which surface or surfaces of the object the values of the limit coordinate refer. Proceeding with the method, at each of the points defined by a respective shape category, a position of at least one surface of the object along the direction normal to the plane is measured. The position of the surface at such a point is the value of the coordinate along the direction normal to the plane where the surface intersects the normal to the plane erected at the respective point. It should be noted that if the shape category specifies more than one surface to be measured, there may be points among the points defined by the shape category which are used in the measurements for only some of, but not all of the surfaces considered. It is of course also possible that for each surface considered all of the points are used.

Measuring the position of the at least one surface can be performed with any suitable measuring apparatus known in the art for performing such measurements on the type of object to be classified. A measuring apparatus is suitable, if it can provide measurement values of the surface position in a direction normal to the plane, as discussed above. Otherwise the nature of the measuring apparatus is irrelevant for the method of the invention.

Next, it is checked for each respective shape category, whether all measured positions of the at least one surface are compatible with the corresponding at least one limit coordinate. If this is the case the object is classified to be of the respective shape category. A measured position of a surface is compatible with the corresponding limit coordinate at a particular point of the points defined by the shape category it depending on the geometry of the arrangement of object and measuring apparatus and the definition of the shape category, it is smaller or larger than the limit coordinate.

From the above it becomes apparent to the skilled person that for each shape category the limit coordinates define at least one boundary for a surface of the object. The object is classified to he n the respective shape category or not to be in the respective shape category depending on the location relative to the at least one boundary of the measured positions of the surface.

The user of the method is free to specify the defining elements of a shape category, namely the plane, points in the plane, and the boundary in terms of the limit coordinates. Therefore the method evidently is very flexible and can be easily adapted to new requirements, like new types of components or novel fashions of assembling components.

In an embodiment of the method, for each of the points defined by the shape category, or at least for a non-empty subset thereof, two limit coordinates are provided, corresponding to an upper limit and a lower limit, respectively, of the coordinate along a direction normal to the plane. in this embodiment a measured position is compatible with the two limit coordinates, if the measured position corresponds to a coordinate value between the lower limit and the upper limit. The lower limit and the upper limit may in particular both refer to the measured position of one and the same surface, i.e. the sets of lower limits and upper limits, as specified by the shape category, then define a lower boundary and an upper boundary for this surface, Which has to lie between the lower boundary and the upper boundary in order that a corresponding object be classified into the respective shape category. As an alternative, the lower limit may be a limit coordinate for a position of a lower surface of the object and the upper limit may be a limit coordinate for a position of an upper surface of the object. Thus in this case two surfaces are involved, where at any point in the plane the upper surface has a higher value of the coordinate along the direction normal to the plane than the lower surface. Here, again, each surface, i.e. the upper surface and the lower surface, must lie between an upper boundary and a lower boundary defined by the limit coordinates. An example of this alternative is an object which is classified based on the shape of a front side and a back side, or a top side and a bottom side.

In an embodiment the at least one limit coordinate for each point s specified as a deviation from a nominal surface at the respective point. The nominal surface is part of a nominal shape of the objects to be classified. The nominal shape is provided as part of the definition of the respective shape category. At each point defined by the shape category in the plane, the nominal surface intersects the direction normal to the plane at a certain value of the corresponding coordinate, thus giving a reference value for the coordinate normal to the plane at the respective point. The deviation then is defined with respect to this reference value. In cases where more than one surface of the object is measured, a nominal surface may be provided for each surface.

A shape category defines a plane and points therein relative to the object. A comparison of results of surface position measurements performed on an object with limit coordinates defined by the shape category only makes sense, if the plane and points therein defined by the shape category are correctly aligned with the object as measured. In order to achieve this alignment, prior to the measurements of the position of the at least one surface, measurements are performed on the object to obtain a location of a center of the object, a rotation of the object in the plane relative to a reference angle, and a tilt of the object relative to the direction normal to the plane, and wherein the location of the center of the object, the rotation and the tilt are used to align the points defined by each category with the object. In a specific embodiment, a shape category also provides a nominal shape of the object to be classified, and the shape category defines the plane and points therein with respect to the nominal shape of the object. Also, a location of a center of the nominal shape is included in the definition of the shape category; the location of this center may be calculated from the nominal shape. The location of the center of the object, the rotation and the tilt of the object are then determined with respect to the nominal shape of the object.

Here it should be noted that the nominal shape, given as an abstract mathematical representation by the shape category, strictly speaking has neither orientation nor position in space. The real object, placed into a measuring apparatus for performing the measurements of the positions of one or plural surfaces, on the contrary has orientation and position in space. In the shape category, the plane and points therein are defined relative to the object, and this has to be taken into account when performing the measurements. The measuring apparatus must determine the location of a center of the object, rotation and tilt of the object relative to a machine coordinate system of the measuring apparatus, and then convert the coordinates given relative to the nominal shape of the object into machine coordinates, so that eventually the points relative to the object at which measurements are performed correspond to the points defined in the shape category. If this is achieved, the points defined in the shape category and the object are correctly aligned. Likewise, the results of the measurement have to be converted into coordinates relative to the object, so that comparison with the limit coordinates defined in the shape category is possible. Alternatively, the limit coordinates could be converted into the machine coordinate system for comparison.

The method according to the invention allows the user to define shape categories very flexibly. A particular way of defining a shape category is to derive the defining quantities of a shape category from a set of objects which are examples of the category to be defined. One possibility for doing this is as described below.

For each object, at a number of points in a plane relative to the respective object, the position of a surface of the object in a direction normal to the plane is measured. Here the locations of the points relative to the plane, and the position of the plane relative to the object are the same for each object. A nominal shape for the shape category is defined by giving for each point in the plane a coordinate in the direction normal to the plane, which is taken to be the coordinate at which a nominal surface of the nominal shape intersects the normal to the plane at the point. For each point in the plane, a set of values of the position of the surface of the object along the direction normal to the plane results from the measurements, one value from each object measured. As value for the coordinate, at each of the points, for the nominal surface, the average of the set of values corresponding to the point is chosen. The limit coordinates at the points are set, for example by a user. Alternatively, from the sets of position values obtained for each point in the plane also the limit coordinates may be derived. The limit coordinate at each point then is defined by giving a deviation from the position of the nominal surface, the average introduced above. The deviation for a point in the plane is set equal to a predefined multiple of the standard deviation of the values in the set of measured surface positions for the respective point. As a non-limiting example, six times the standard deviation may be chosen. In a specific further development, for each object a location of a center of the object, a rotation and a tilt of the object are determined, and the number of points relative to the respective object are specified relative to the center of the respective object, in a plane defined by the tilt and rotation of the object.

In an example embodiment of the method, all shape categories use the same points in the plane.

In an embodiment of the method where a limit coordinate is specified as deviation from a nominal shape, for at least one shape category, instead of separately specifying a deviation at each point in the plane, the nominal surface is divided into zones and a common deviation is specified for each zone.

The skilled person will realize that many of the steps described above are advantageously performed on or with the help of at least one computer.

These and other objects, advantages and features of the present invention will be better appreciated by those having ordinary skill in the art in view of the following detailed description of the invention in view of the drawings.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
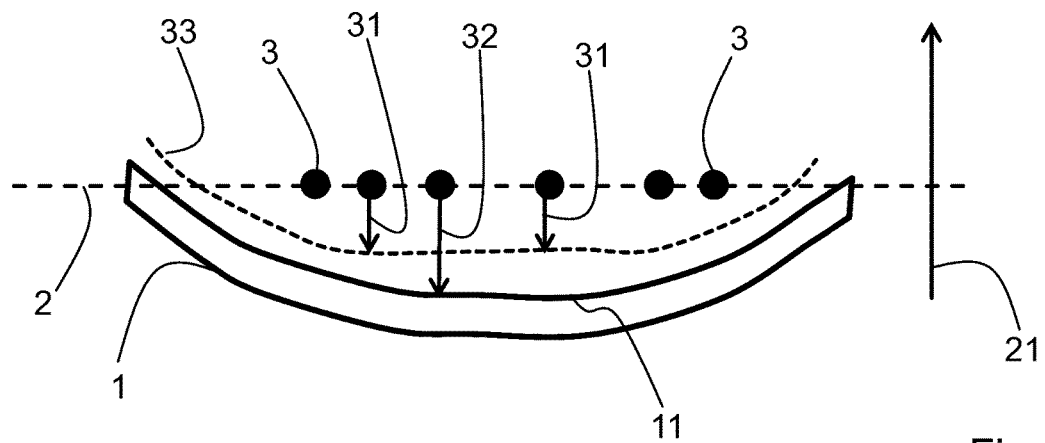
FIG. 1 shows an object and illustrates the basic concept of the invention.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. Also, it is to be understood that the invention is not limited in its application to the details of construction and the arrangement of the components set forth in the following description or illustrated in the drawings. The invention is applicable to other embodiments or of being practiced or carried out in various ways and is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In the below description, an embodiment is an example or implementation of the invention. The various appearances of "one embodiment", "an embodiment", "certain embodiments" or "some embodiments" do not necessarily all refer to the same embodiments.

FIG. 1 is an illustration of object 1. Associated with object 1, by definitions in the shape categories used, is plane 2, with an associated direction 21 normal to plane 2. Each shape category defines a number of points 3, shown here as black dots, in plane 2. A convenient way of doing this is by specifying coordinates of the points in the plane relative to a coordinate system defined in the plane as part of the respective shape category. This coordinate system may for example be a Cartesian coordinate system. Other types of coordinate system in the plane are also possible, however. In the shape category, for each point 3, at least one limit coordinate 31 is defined. In the drawing, one limit coordinate is shown for two points 3 only, for the sake of clarity. Limit coordinates 31 are coordinates along direction 1 normal to plane 2. The set of all limit coordinates 31 is on a limit surface or boundary 33, and actually defines this boundary.

According to the method, at each point 3, a position of at least one surface 11 of object 1 is measured along the direction normal to plane 2. If plane 2 is defined as having value zero of the coordinate along direction 21 normal to plane 2, then, in view of the direction of the arrows shown, measured position 32 as well as limit coordinates 31 are negative in the example shown in the drawing. This, of course, is not a limitation of the invention, According to the method it is checked whether all measured positions 32 are compatible with the respective limit coordinates 31, i.e. for each point 3 it is checked whether position 32 measured for surface 11 at the respective point 3 is compatible with the limit coordinate 31 defined for the same point 3. The meaning of compatible is part of the definition of the respective shape category, and may for example state that surface 11 considered has to lie below boundary 33 at each point 3. In the example shown in the drawing, in this case the measured positions 32 would be compatible with limit coordinates 31. If the measured positions 32 are compatible with limit coordinates 31, then object 1 is classified to be in the respective shape category, otherwise it is classified not to be in the respective shape category.

This process may be repeated for any number of shape categories provided, for example provided by a user.

Figure 2:
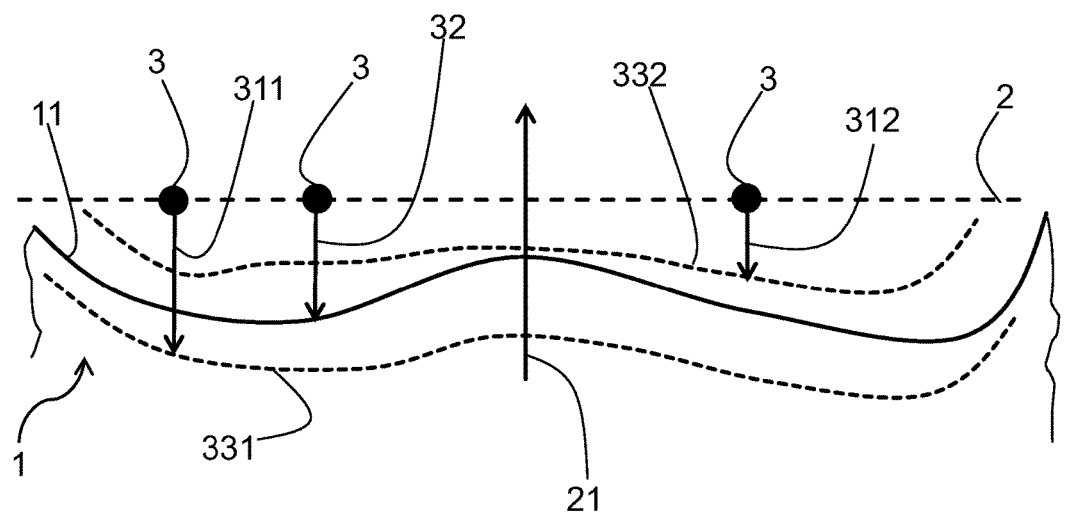
FIG. 2 illustrates an embodiment with two limit coordinates defined per point, the limit coordinates related to one surface of the object.

FIG. 2 shows only part of object 1, and in particular one surface 11 thereof. Shown are three points 3 in plane 2, defined by a shape category. For each point 3, the shape category defines two limit coordinates, upper limit 312 and lower limit 311. At each point 3 position 32 of surface 11 in direction 21 normal to plane 2 is measured. In the drawing, for reasons of clarity of illustration, lower limit 311, measured position 32, and upper limit 312 are shown for separate points 3. The set of all upper limit coordinates 312 defines upper boundary 332, the set of all lower limit coordinates 311 defines lower boundary 331. Surface 11, and thus object is compatible with the respective shape category, if surface 11 lies between lower boundary 331 and upper boundary 332, or, more precisely, if at each point 3 measured position 32 is compatible with limit coordinates 311, 312. At each point 3 measured position 32 is compatible with the limit coordinates, if measured position 32 at the respective point 3 lies between lower limit coordinate 311 and upper limit coordinate 312 defined for the respective point 3.

Figure 3:
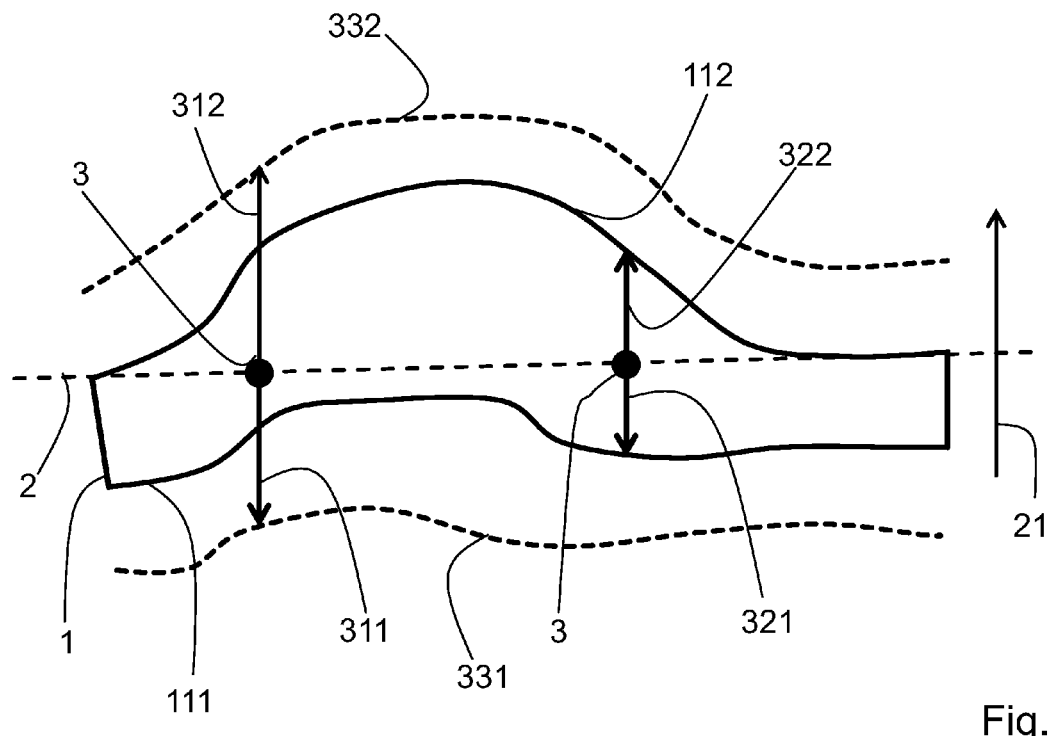
FIG. 3 illustrates an embodiment with two limit coordinates defined per point, related to two surfaces of the object.

FIG. 3 shows object 1, plane 2 as defined by a shape category, and a normal 21 to plane 2. Shown are two points 3 in plane 2. The shape category defines for each of the points 3 an upper limit coordinate 312 and a lower limit coordinate 311. In this embodiment the lower limit coordinate 311 refers to lower surface 111 of object 1, while the upper limit coordinate 312 refers to upper surface 112 of object 1, different from lower surface 111. For each point 3, a position 322 of upper surface 112 along direction 21 normal to plane 2 is measured. Also, for each point 3, a position 321 of lower surface 111 along direction 21 normal to plane 2 is measured. Object 1 is classified to be in the respective shape category, if at each point 3 position 321 of lower surface 111 of object 1 is above the lower limit coordinate 311 defined for that point 3, and if at each point 3 position 322 of upper surface 112 of object 1 is below the upper limit coordinate 312 defined for that point 3. It can also be stated that the set of all lower limit coordinates 311 defines upper boundary 331, and the set of all upper limit coordinates 312 defines upper boundary 332. Object 1 is classified to be in the respective shape category if both lower surface 111 of object 1 and upper surface 112 of object 1 lie between lower boundary 331 and upper boundary 332, which implies that object 1 lies between lower boundary 331 and upper boundary 332.

Figure 4:
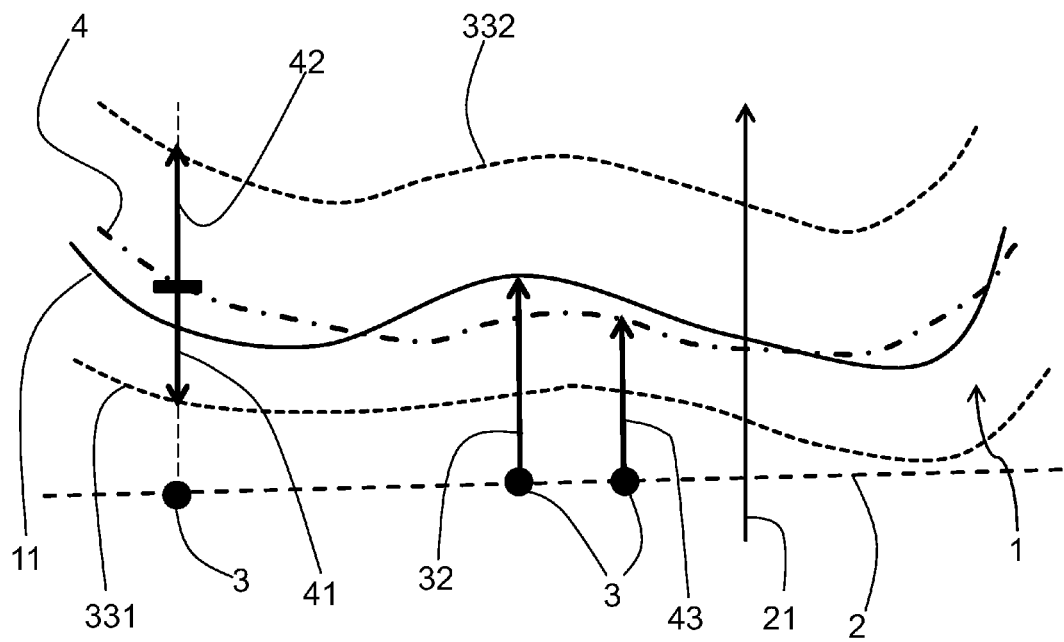
FIG. 4 illustrates an embodiment where the shape category defines a nominal surface and deviations therefrom.

FIG. 4 illustrates an embodiment where a shape category defines nominal surface 4, plane 2 and points 3 in the plane. Furthermore, at each point 3 the shape category defines at least one deviation, here two deviations, henceforth referred to as up-deviation 42 and down-deviation 41, Nominal surface 4 is defined by the shape category specifying at each point 3 coordinate 43 of nominal surface 4 in direction 21 normal to plane 2, i.e. a value of the coordinate in direction 21 normal to plane 2 where nominal surface 4 intersects a normal to plane 2 erected at the respective point 3. Deviations 41 and 42 give the limit coordinates as discussed above at each point by specifying the difference of the limit coordinates from coordinate 43 of nominal surface 4 at each respective point 3, along direction 21 normal to plane 2. In this way the set of all up-deviations 42 specifies upper boundary 332, the set of all down-deviations 41 specifies upper boundary 331. A surface 11 of object 1, here shown only partially, and hence object 1, are classified to be in the respective shape category if surface 11 of object 1 is between upper boundary 332 and lower boundary 331, in analogy to the embodiment shown in FIG. 2.

If more than one surface of an object is relevant for classification of the object, a nominal surface and corresponding deviations can be defined for each relevant surface of the object.

Figure 5:
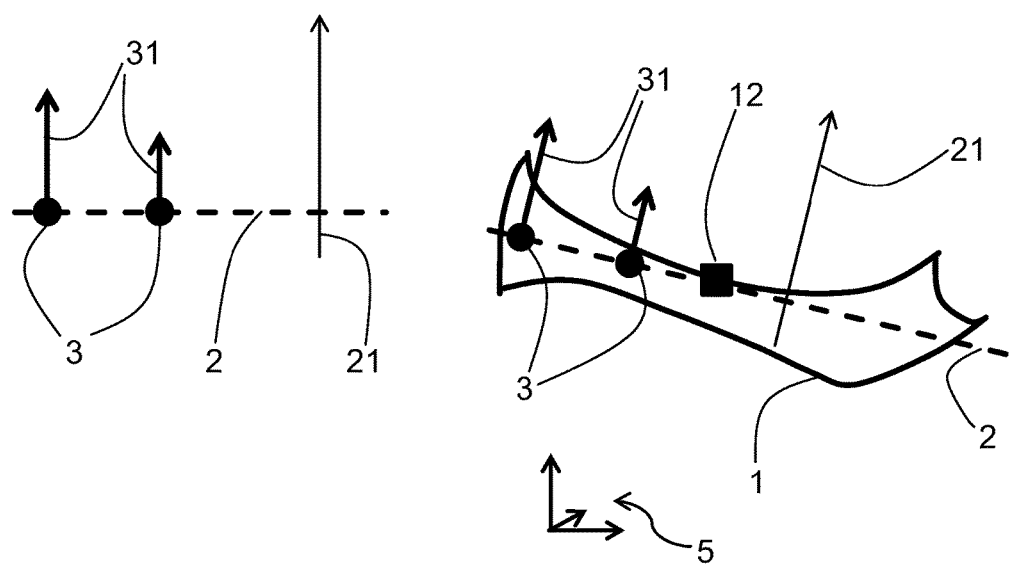
FIG. 5 illustrates an alignment step for the method.

FIG. 5 shows plane 2, direction 21 normal to plane 2, points 3 in plane 2 and limit coordinates 31 defined at the points 3 twice. The left part of the drawing is meant to symbolize the abstract representation of these elements as they enter the definition of a shape category. The points 3 are defined in plane 2, but plane 2 and thus the points 3 have no fixed position in ordinary space, where for example a real object to be classified exists.

On the right, the elements are shown again in relation to object 1 which is to be classified. Object 1 may for example be located in an apparatus (not shown) for performing measurements of surface positions on object 1, required for the method as discussed above. Shown is coordinate system 5 of such an apparatus. The manner how plane 2 is positioned and oriented with respect to object 1 is part of the definition in a shape category. In a specific embodiment, this definition may give position and orientation of plane 2 with respect to a nominal shape of the object considered, where the nominal shape is part of the definition of the shape category. This definition can for example stipulate to position an origin of a coordinate system of plane 2 at center 12 of object 1, center 12 of object 1 being determined by three-dimensional measurements of object 1. The orientation of plane 2 relative to object 1 can be determined for example by reference structures or portions of the object, like a specific corner or edge of the object. It is also possible that object 1 is aligned with coordinate system 5 of the measuring apparatus, and the alignment of plane 2 with object 1 can make use of the former alignment. In such a case, plane 2 may actually be specified with respect to coordinate system 5 of the measuring apparatus in an identical manner for each shape category, i.e. independently of the shape category. Here the shape category implicitly specifies plane 2, as the points 3 specified by the shape category relate to an object aligned as stated. Similarly, in cases where the alignment of object 1 is always performed according to a defined systematic procedure, the position and orientation of plane 2 with respect to object 1 can result from this alignment procedure. In this case, as long as it is clear for a given shape category that the points is specifies relate to objects aligned by a specific procedure, information on the position and orientation of plane 2 with respect to object 1 can be implicit, i.e. the shape category specifies plane 2 by its connection with the specific alignment procedure, without having to provide explicit data on position and orientation of plane 2.

In any case, once plane 2 is properly aligned with object 1, a relation between coordinates in plane 2 and along direction 21 normal to plane 2 on the one hand, and coordinates in coordinate system 5 of the measuring apparatus on the other hand results. For example, the coordinate system in the plane together with the coordinate in direction 21 along the normal to plane 2 may form a three-dimensional Cartesian system, and coordinate system 5 of the measuring apparatus may also be Cartesian. The position of the origin of the coordinate system in plane 2 in coordinate system 5 of the measuring apparatus can be specified by a shift vector, for example a vector indicating the position of center 12 of object as measured, in coordinate system 5 of the measuring apparatus. The relative orientation of the two Cartesian coordinate systems can for instance be expressed by Euler angles, as commonly known. Euler angles in this context are a specific way of specifying rotation and tilt of plane 2 relative to a reference, for example coordinate system 5 of the measuring apparatus.

Once alignment is achieved, the measurements of positions of object surfaces as described above can be performed.

Figure 6:
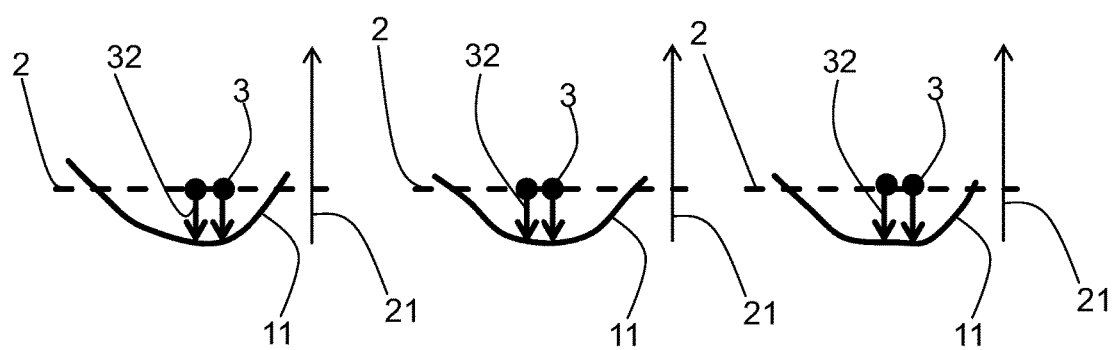
FIG. 6 illustrates a way to obtain a shape category from object samples.

FIG. 6 illustrates how elements forming the definitions contained in a shape category can be obtained from measurements of samples of objects. To this end, a plurality of sample objects is provided, each object represented here only by a surface 11 of the respective object to be classified. Plane 2 is defined for each object, by measuring the object and choosing the position of the origin of the plane and the plane's orientation as discussed in FIG. 5 in the context of preparation for measurement of surface positions. A set of points 3 is chosen in plane 2, the coordinates of the points in the respective plane identical for each object. Then the positions 32 of surface 11 along direction 21 normal to plane 2 are measured at each point for each surface.

For a specific point 3, identified by coordinates in plane 2, a number of measured position values equal to the number of object samples (in the drawing three) results. For this specific point, the coordinate of a nominal surface is defined as the average of the position measurements obtained for this point. The standard deviation of the position measurements obtained for the point is used to define the at least one deviation from the nominal surface. Each deviation defined for a point is set to a predetermined multiple of the standard deviation. For example, one deviation could be associated with each point, and set to six times the standard deviation. If two deviations, up-deviation and down-deviation as introduced above, are associated with each point, the up-deviation could be set to a first multiple of the standard deviation, for example five times the standard deviation, and the down deviation could be set to a second multiple of the standard deviation, for example four times the standard deviation. Of course, first and second multiple can also be equal.

Figure 7:
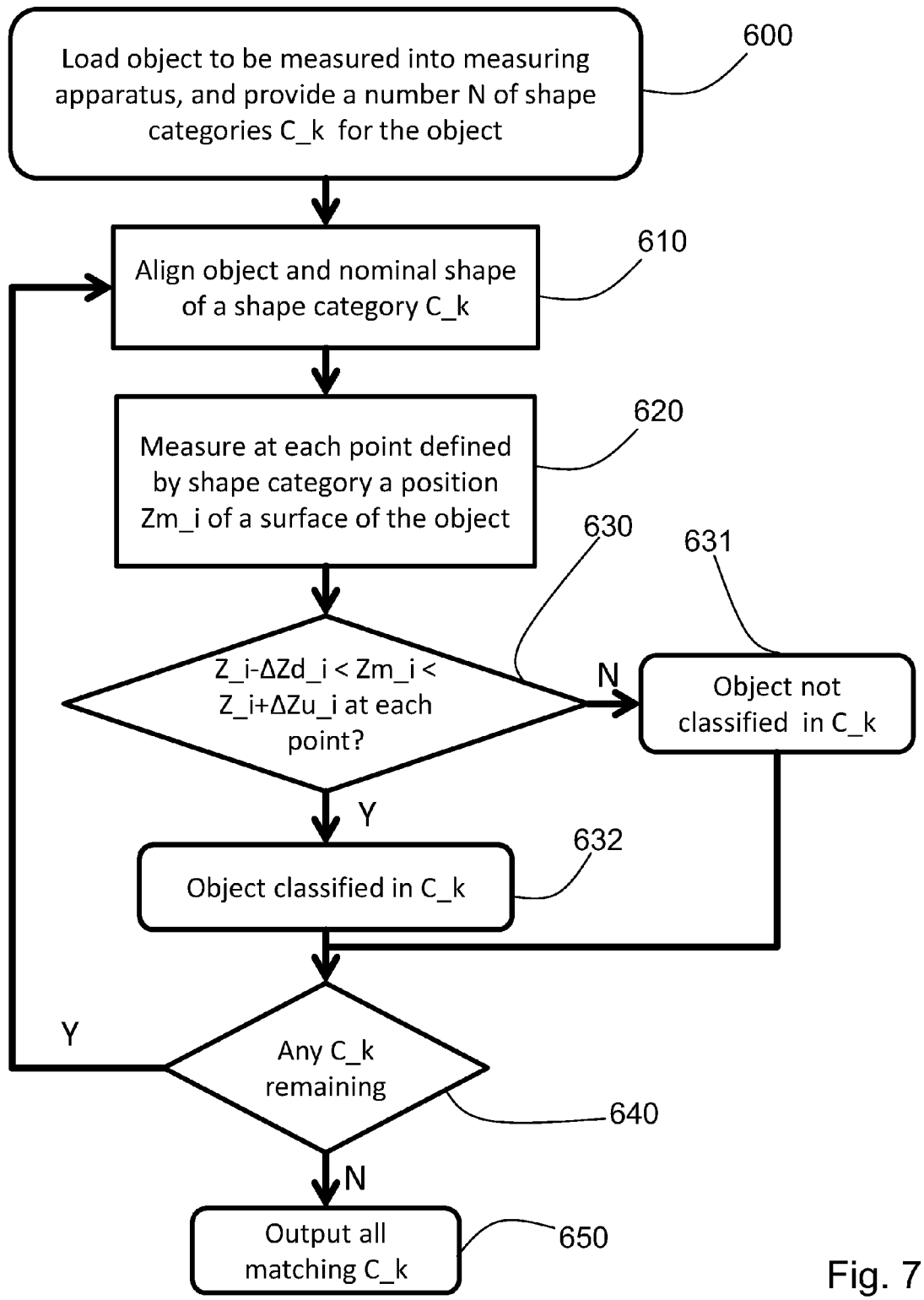
FIG. 7 is a flow chart describing a specific embodiment of the method.

FIG. 7 illustrates an embodiment of the method. At the beginning of the method, at step 600, the object to be classified is loaded into a measuring apparatus. A number N of shape categories $C\_k$, $1 \leq k \leq N$, are also provided, for example to a computer performing the method and controlling also the measuring apparatus. Each shape category $C\_k$ specifies a nominal shape for the object. The nominal shape comprises a nominal surface of the object. Each shape category $C\_k$ further provides a number $M\_k$ of points in a plane relative to the nominal shape. The points can for example be specified by coordinates in the plane, e.g. by Cartesian coordinates $(X\_i, Y\_i)$, $1 \leq i \leq M\_k$; the nominal surface gives a coordinate $Z\_i$, $1 \leq i \leq M\_k$, along a direction normal to the plane at each of the $M\_k$ points. For each point the shape category $C\_k$ also specifies two deviations $\Delta Zu\_i$ and $\Delta Zd\_i$ from the coordinate $Z\_i$, $1 \leq i \leq M\_k$; $\Delta Zu\_i$ will also be referred to as the up-deviation, and $\Delta Zd\_i$ as the down-deviation in what follows, and as regards their role in the method correspond to the up-deviation 42 and the down-deviation 41 as discussed in FIG. 4. The following steps 610 to 640 are performed for each shape category $C\_k$, $1 \leq k \leq N$, for example in a loop over the shape categories.

For any given shape category $C\_k$, in step 610 the object and the nominal shape as defined in the shape category, are aligned with each other, as has been discussed above. In step 620, at each of the number $M\_k$ of points defined by the respective shape category $C\_k$, a position of a surface of the object along the direction normal to the plane is measured, resulting in a measured value $Zm\_i$, $1 \leq i \leq M\_k$, for each respective point. Then, in step 630, it is checked for the respective shape category $C\_k$ whether $Z\_i - \Delta Zd\_i < Zm\_i < Z\_i + \Delta Zu\_i$ holds for each of the $M\_k$ points, i.e. for $1 \leq i \leq M\_k$. Note that the preceding comparison makes obvious why $\Delta Zd\_i$ is called a down-deviation and $\Delta Zu\_i$ is called an up-deviation. As the comparison is written here, both $\Delta Zd\_i$ and $\Delta Zu\_i$ are positive. In terminology introduced earlier, $Z\_i - \Delta Zd\_i$ gives a lower limit coordinate for the respective point, such as for example the lower limit coordinate 311 in FIG. 2, and $Z\_i + \Delta Zu\_i$ gives an upper limit coordinate for the respective point, such as for example the upper limit coordinate 312 in FIG. 2.

If it turns out in step 630 that $Z\_i-\Delta Zd\_i<Zm\_i<i+\Delta Zu\_i$ holds for each of the M_k points, i.e. if branch Y is followed from step 630, the object is classified to be in shape category C_k in step 632. If it turns out in step 630 that $Z\_i-\Delta Zd\_i<Zm\_i<Z\_i+\Delta Zu\_i$ does not hold for at least one of the M_k points, i.e. if branch N is followed from step 630, the object is classified not to be in shape category C_k in step 631.

In either case, the method proceeds to step 640 and checks whether any shape categories C_k remain to be considered for the object. If so, i.e. if branch Y is followed from step 640, the method returns to step 610. The method performs step 610 and the following steps up to step 640 with respect to a further, previously not considered one of the shape categories C_k provided for the object in step 600. If no further shape categories remain, i.e. if branch N is followed from step 640, all shape categories which resulted in a match, i.e. for which branch Y was followed from step 630, are output in step 650, for example on a display for a user or to a memory device for later use.

In the method described so far in the context of FIG. 7, the shape categories C_k referred to one surface of the object to be classified, and for this surface in each shape category C_k an upper and a lower limit coordinate were defined via the nominal surface positions Z_i and the up- and down-deviations $\Delta Zu\_i$ and $\Delta Zd\_i$. If more than one surface of the object needs to be considered for full classification of the object, the method as described can be repeated for each further surface to be considered. Depending on the design of the measurement apparatus, the object may or may not have to be repositioned or reoriented in the measurement apparatus in step 600.

Figure 8:
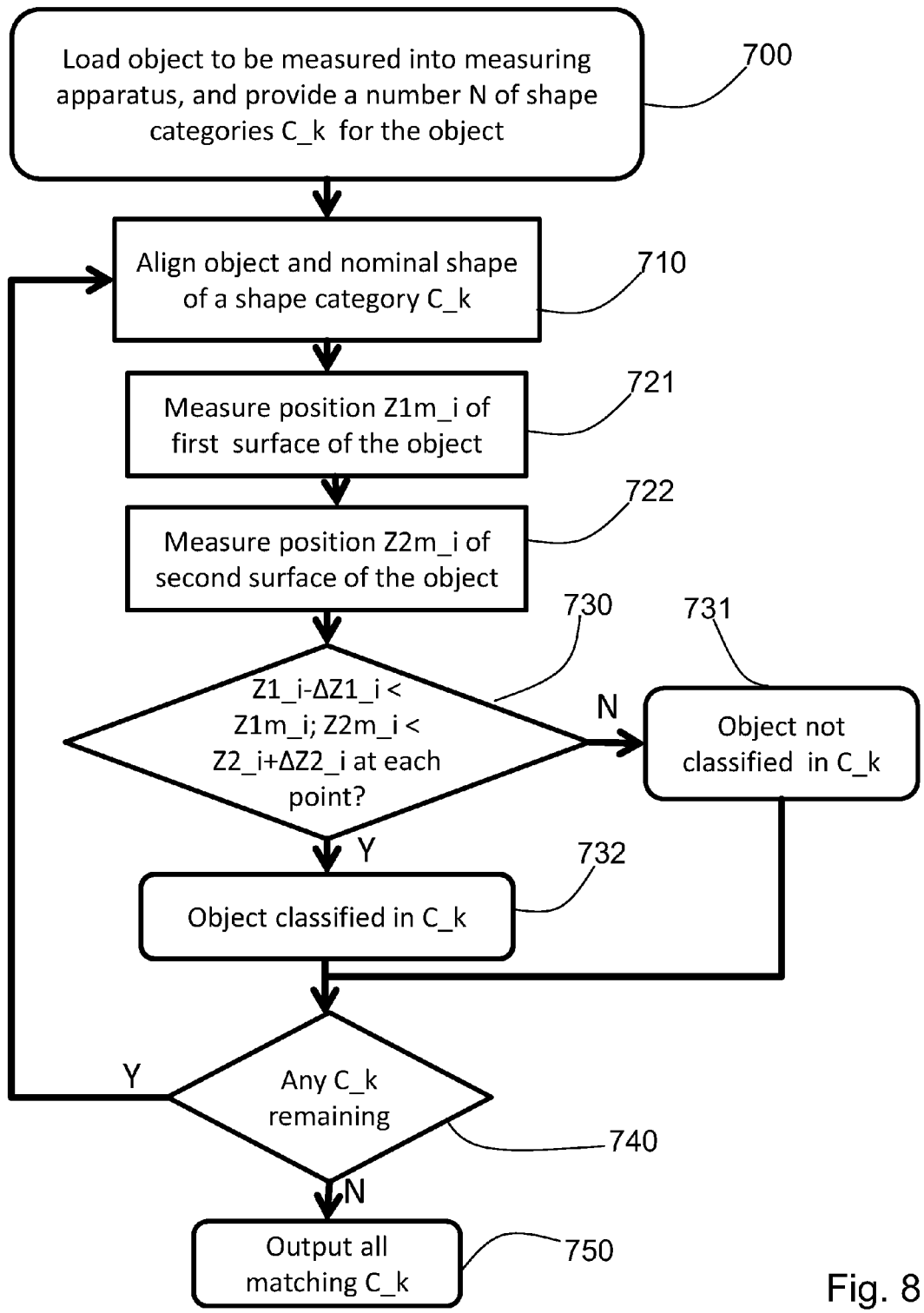
FIG. 8 is a flow chart describing a further specific embodiment of the method.

FIG. 8 illustrates a further embodiment of the method. The method is similar to the method discussed in the context of FIG. 7, but here two surfaces of the object are considered, wherein to each of these two surfaces there corresponds a respective nominal surface defined by the shape categories.

At the beginning of the method, at step 700, the object to be classified is loaded into a measuring apparatus. A number N of shape categories C_k, $1 \leq k \leq N$, are also provided, for example to a computer performing the method and controlling also the measuring apparatus. Each shape category C_k specifies a nominal shape for the object. The nominal shape comprises a first nominal surface and a second nominal surface of the object. Each shape category C_k further provides a number M_k of points in a plane relative Co the nominal shape. The points can for example be specified by coordinates in the plane, e.g. by Cartesian coordinates $(X\_i, Y\_i)$, $1 \leq i \leq M\_k$. The first nominal surface gives a coordinate $Z1\_i$, $1 \leq i \leq M\_k$, along a direction normal to the plane at each of the M_k points. The second nominal surface gives a coordinate $Z2\_i$, $1 \leq i \leq M\_k$, along the direction normal to the plane at each of the M_k points. The shape category also specifies for each such point a deviation $\Delta Z1\_i$ from the coordinate $Z1\_i$ and a deviation $\Delta Z2\_i$ from the coordinate $Z2\_i$ along the direction normal to the plane. The following steps 710 to 740 are performed for each shape category C_k, $1 \leq k \leq N$, for example in a loop over the shape categories.

In step 710 the object and the nominal shape are aligned with each other, as in the method discussed in the context of FIG. 7. In step 721, at each of the number M_k of points a position of a first surface of the object along the direction normal to the plane is measured. A measured value $Z1m\_i$ results for each respective point. In step 722, at each of the number M_k of points a position of a second surface of the object along the direction normal to the plane is measured. A measured value $Z2m\_i$ results for each respective point.

In step 730 it is checked for the respective shape category whether $Z1\_i-\Delta Z1\_i<Z1m\_i$ and $Z2m\_i<Z2\_i+\Delta Z2\_i$ hold for each of the M_k points. if these conditions hold, i.e. if branch Y is followed from step 730, the object is classified to be in shape category C_k in step 732. Otherwise, i.e. if branch N is followed from step 730, the object is not classified to be in shape category C_k in step 731.

In either case, the method proceeds to step 740 and checks whether any shape categories C_k remain to be considered for the object. If so, i.e. if branch Y is followed from step 740, the method returns to step 710. The method performs step 710 and the following steps up to step 740 with respect to a further, previously not considered one of the shape categories C_k provided for the object in step 700. If no further shape categories remain, i.e. if branch N is followed from step 740, all shape categories which resulted in a match, i.e. for which branch Y was followed from step 730, are output in step 750, for example on a display for a user or to a memory device for later use.

The invention is not limited to those diagrams or to the corresponding descriptions. For example, flow need not move through each illustrated box or state, or in exactly the same order as illustrated and described.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

LIST OF REFERENCE CHARACTERS

1 object
11 surface (of object)
111 lower surface (of object)
112 upper surface (of object)
12 center (of object)
2 plane
21 direction (normal o plane)
3 point
31 limit coordinate
311 tower limit coordinate
312 upper limit coordinate
32 position (of surface)
321 position (of lower surface)
322 position (of upper surface)
33 boundary
331 lower boundary
332 upper boundary
4 nominal surface
41 down-deviation (from nominal surface)
42 up-deviation (from nominal surface)
43 coordinate (of nominal surface)
5 coordinate system of measuring apparatus
600-650 method steps
700-750 method steps

What is claimed is:

1. A method for shape classification of an object, the method comprising the steps:

providing a first number, N, of a plurality of shape categories, each shape category:
   specifying a second number, M_k, of points in a plane relative to the object; and,
   specifying for each point at least one limit coordinate along a direction normal to the plane;
measuring at each of the points a position of at least one surface of the object along the direction normal to the plane; and,
checking, for each shape category, whether all measured positions of the at least one surface are compatible with the corresponding at least one limit coordinate, and if this is the case classifying the object to be of the respective shape category,
wherein, prior to the measurements of the position of the at least one surface, the object is measured to obtain a rotation of the object in the plane and a tilt of the object relative to the direction normal to the plane, and wherein the rotation and the tilt are used to align the points defined by each category with the object.

2. The method of claim 1, wherein for each of the points, or at least of a non-empty subset thereof, two limit coordinates are provided, corresponding to an upper limit and a lower limit, respectively, of the coordinate along the direction normal to the plane, and a measured position is compatible with the two limit coordinates, if the measured position corresponds to a coordinate value between the lower limit and the upper limit.

3. The method of claim 2, wherein at each point the lower limit and the upper limit are limit coordinates for a position of one surface of the object.

4. The method of claim 2, wherein the lower limit is a limit coordinate for a position of a lower surface of the object and the upper limit is a limit coordinate for a position of an upper surface of the object.

5. The method of claim 1, wherein the at least one limit coordinate for each point is specified as a deviation from a nominal surface at the respective point, the nominal surface forming part of a nominal shape provided as part of the definition of the respective shape category.

6. The method of claim 5, wherein positions of more than one surface of the object are measured, and a nominal surface is provided for each of the surfaces measured.

7. The method of claim 5, wherein at least one of the shape categories is defined from a plurality of objects by the following steps:
   measuring for each object, at a number of points in a plane relative to the respective object, the position of a surface of the object in a direction normal to the plane, the points being identical for each object;
   specifying the coordinate in the direction normal to the plane for the nominal shape for the shape category at each of the points as the average of the positions of the surface measured at the respective point for each object; and,
   specifying the limit coordinate at each of the points.

8. The method of claim 7, wherein the limit coordinate is specified as deviation from the nominal shape by setting the deviation at each of the points equal to a predefined multiple of the standard deviation of the positions of the surface measured at the respective point.

9. The method of claim 7, wherein for each object a location of a center of the object, a rotation and a tilt of the object are determined, and the number of points relative to the respective object are specified relative to the center of the respective object.

10. The method of claim 5, wherein for at least one shape category the nominal surface is divided into zones and a common deviation is specified for each zone.

11. The method of claim 1, wherein, prior to the measurements of the position of the at least one surface, the object is measured to obtain a location of a center of the object, and wherein the location of the center of the object, the rotation and the tilt are used to align the points defined by each category with the object.

12. The method of claim 11, wherein the location of the center of the object, the rotation and the tilt of the object are determined with respect to a nominal shape of the object.

13. The method of claim 1, wherein the shape categories agree with respect to the points in the plane.

14. A method for shape classification of an object, the method comprising the steps:
   a) providing a number N of a plurality of different shape categories $C\_k$, $1 \le k \le N$, each shape category $C\_k$ specifying a nominal shape comprising a nominal surface, a number $M\_k$ of points in a plane relative to the nominal shape, the nominal surface giving a coordinate $Z\_i$, $1 \le i \le M\_k$, along a direction normal to the plane at each of the $M\_k$ points, and the shape category also specifying for each such point two deviations $\Delta Zu\_i$ and $\Delta Zd\_i$ from the coordinate $Z\_i$;
   b) aligning the object and the nominal shape with each other;
   c) measuring at each of the number $M\_k$ of points a position of a surface of the object along the direction normal to the plane, resulting in a measured value $Zm\_i$ for each respective point;
   d) checking for each shape category $C\_k$ whether $Z\_i - \Delta Zd\_i < Zm\_i < Z\_i + \Delta Zu_{13}$ i holds for each of the $M\_k$ points, and if so, classifying the object to be of the respective shape category;
   e) repeating steps b to d for each shape category; and
   f) repeating steps a to e for each surface relevant for the classification of the object,
   wherein, prior to measuring at each of the number $M\_k$ of points, the object is measured to obtain a rotation of the object in the plane and a tilt of the object relative to the direction normal to the plane, and wherein the rotation and the tilt are used to align the points defined by each category with the object.

15. A method for shape classification of an object, the method comprising the steps:
   a) providing a number N of a plurality of different shape categories $C\_k$, $1 \le k \le N$, each shape category specifying a nominal shape comprising a first nominal surface and a second nominal surface, a number $M\_k$ of points in a plane relative to the nominal shape, the first nominal surface giving a coordinate $Z1\_i$, $1 \le i \le M\_k$, along a direction normal to the plane at each of the $M\_k$ points, the second nominal surface giving a coordinate $Z2\_i$, $1 \le i \le M\_k$, along the direction normal to the plane at each of the $M\_k$ points, and the shape category also specifying for each such point a deviation $\Delta Z1\_i$ from the coordinate $Z1\_i$ and a deviation $\Delta Z2\_i$ from the coordinate Z2 i;
   b) aligning the object and the nominal shape with each other;
   c) measuring at each of the respective number $M\_k$ of points a position of a first surface of the object along the direction normal to the plane, resulting in a measured value Z1 m_i for each respective point;
   d) measuring at each of the respective number $M\_k$ of points a position of a second surface of the object along the direction normal to the plane, resulting in a measured value $Z2\_m\_i$ for each respective point;

e) checking for each shape category whether $Z1\_i - \Delta Z1\_i < Z1m\_i$ and $Z2\_m\_i < Z2\_i + 66\ Z2\_i$ hold for each of the $M\_k$ points, and if so, classifying the object to be of the respective shape category; and f) repeating steps b to e for each shape category, wherein, prior to measuring at each of the respective number $M\_k$ of points, the object is measured to obtain a rotation of the object in the plane and a tilt of the object relative to the direction normal to the plane, and wherein the rotation and the tilt are used to align the points defined by each category with the object.

\* \* \* \* \*